Aug. 21, 1923.
M. BARTHOLDY
CALIPER GAUGE
Filed Nov. 9, 1921
1,465,295
2 Sheets-Sheet 2
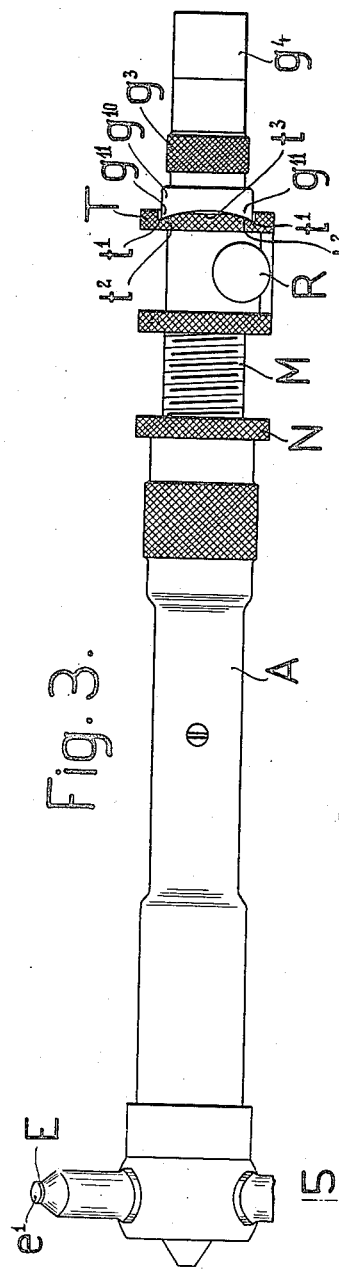
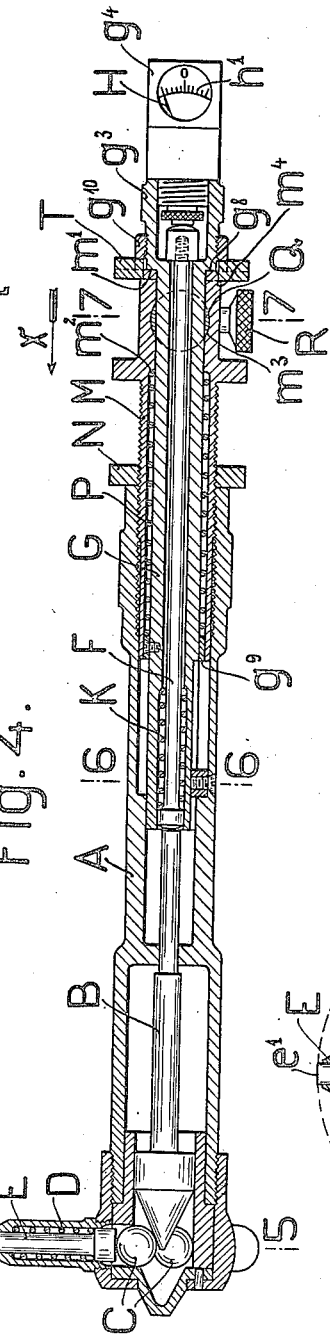
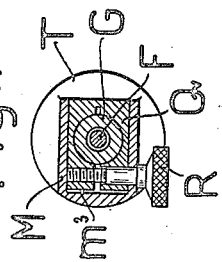
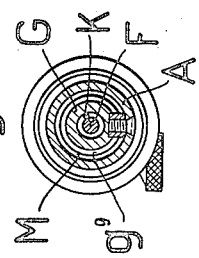
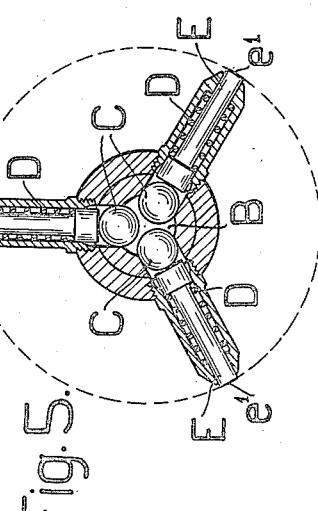

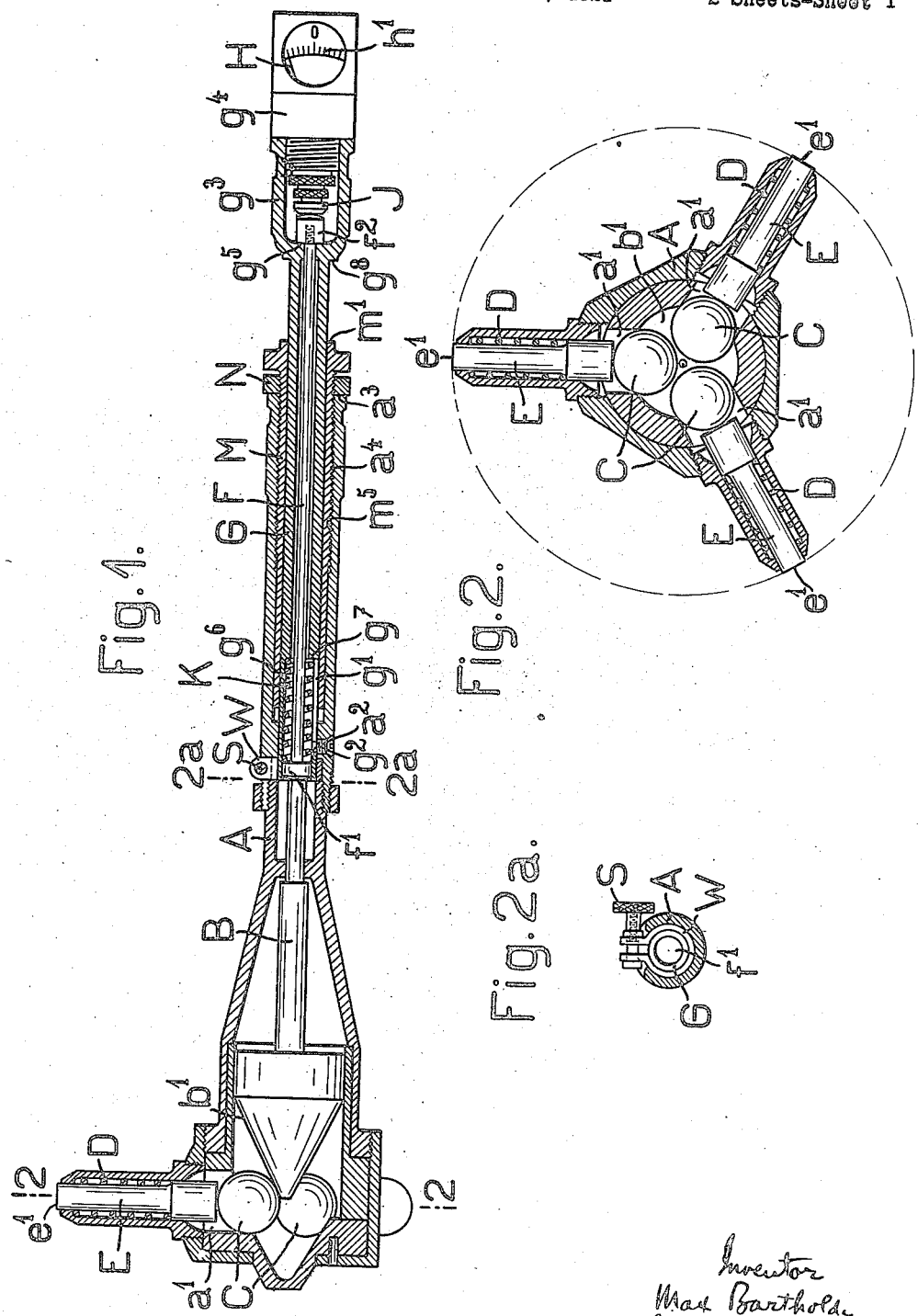

Patented Aug. 21, 1923.

1,465,295

UNITED STATES PATENT OFFICE.

MAX BARTHOLDY, OF ESSEN, GERMANY, ASSIGNOR TO FRIED. KRUPP AKTIENGESELL-SCHAFT, OF ESSEN-ON-THE-RUHR, GERMANY.

CALIPER GAUGE.

Application filed November 9, 1921. Serial No. 514,061.

*To all whom it may concern:*

Be it known that I, MAX BARTHOLDY, residing at Essen, Germany, a citizen of the German Republic, have invented a certain new and useful Improvement in Caliper Gauges, of which the following is a specification.

The present invention relates to caliper gauges and aims particularly to provide a device of the kind which shall have a very simple and effective construction, possess a comparatively large measuring range and which besides shall have the advantage that the measurements are exact and independent of the personal equation of the one making the measurements.

Two embodiments of the invention are illustrated in the drawing showing two internal contacting devices, and Fig. 1 is a longitudinal axial section of the first embodiment, Fig. 2 is a cross-section along line 2—2 of Fig. 1 seen from the left, Fig. $2^a$ is a cross-section along line $2^a$—$2^a$ of Fig. 1, seen from the left, Fig. 3 an elevation of the second embodiment, with one portion broken away, Fig. 4 is a longitudinal, axial section of the second embodiment, Fig. 5 a cross section along line 5—5 of Fig. 4, seen from the left, Fig. 6 illustrates a section along the line 6—6 of Fig. 4 seen from the left, and Fig. 7 is a cross section along line 7—7 of Fig 4, also seen from the left.

The embodiment of the invention illustrated in Figs. 1 and 2 will now be described.

A rod B is slidably mounted in the tubular body A of the gauge, one end of the rod being provided with a conical surface $b^1$. Upon this conical surface rest three balls C, which are guided in individual cylindrical counterbores $a^1$ extending perpendicularly to the direction of movement of the rod B. A plunger E actuated by a spring D is pressed against each of the balls C. The outer ends $e^1$ of the plungers E act as measuring surfaces and are situated in a circle (Fig. 2). With the other end of the rod B a second rod F contacts by means of a head $f^1$. The rod F is mounted in a sleeve G which is slidable in the gauge body A. The sleeve G may be secured with respect to the gauge body A by means of a split ring W, which can be tightened around the sleeve G by a screw S. (See particularly Fig. $2^a$.) A screw $a^2$ secured in the gauge body A engages in a longitudinal slot $g^1$ provided in the sleeve G, and with the details positioned as shown in the drawing, the end portion $g^2$ of the slot $g^1$ abuts against the screw $a^2$.

The enlarged end $g^3$ of the sleeve G, found to the right in Fig. 1, reaches out beyond the gauge body A and carries a housing $g^4$. A stud J is slidably mounted in the housing $g^4$ and through the intermediary of a feeling lever, not shown, operates the indicating needle H of an indicating device H $h^1$. The stud J, actuated by a spring, not shown, contacts with the nut $f^2$, which is secured on the end of the rod F extending into the enlarged portion $g^3$ of the sleeve G. The nut $f^2$ rests against an inner annular surface $g^5$ of the sleeve portion $g^3$, actuated by the strong spring K, which is inserted between the head $f^1$ of the rod F on the one hand, carried in the enlarged bore $g^6$ of the sleeve G, and an inner annular surface $g^7$ on the other hand, formed where the bore changes to the larger one $g^6$. The sleeve G is enclosed by a second sleeve M, which engages, by means of an outer thread $m^5$, with a corresponding inner thread $a^4$ of the gauge body A, so that the sleeve M may be displaced in the gauge body A.

By means of a detachable nut N, which contacts with the end face $a^3$ of the gage body A, the sleeve M is secured to the gauge body A. An accurately finished plain abutment surface $m^1$ is provided, which faces an equally accurate abutment surface $g^8$ on the sleeve portion $g^3$.

In operating the described calipering gauge for measuring straight bores or counterbores, the gauge is first adjusted by means of a ring-gauge, the inner diameter of which accurately represents the desired diameter of the bore to be tested. For this purpose the portion of the gauge which carries the plungers E is inserted in the ring-gauge. The gauge-body A is now held by one hand, and with the other hand, the housing $g^4$ together with the sleeve G is then given a movement in the direction of arrow $x$, Fig. 1, relative to the gauge body A. This displacement of the sleeve G is transmitted to the rod F through the intermediary of the spring K, and further to the rod B, the balls C and the plungers E, which are thereby pushed outwards. The measuring surfaces $e^1$ of the plungers E finally come in contact with the inner wall of the ring-gauge. As soon as this has taken place, the sleeve G together with the housing $g^4$ are displaced, by continued pressure upon the housing $g^4$, with regard to the rod F under compression of the spring K. As a consequence the rod J will be displaced in the opposite direction to the arrow $x$ and the needle H will deflect. The sleeve G is now further displaced in the same direction, till the needle H registers with the zero mark of the graduation $h^1$. At this moment the pressure of the spring K upon the plungers E is of such order that a satisfying contacting is assured between the measuring surfaces $e^1$ and the inner wall of the ring-gauge. The touch sensitiveness of the operator as a factor is thus completely eliminated in consequence of the presence of the spring K. As soon as the needle H registers with the zero mark, the sleeve G is secured with respect to the gauge body A by means of the securing device S W. Thereupon the lock nut N is loosened and the sleeve M screwed out on the gauge-body A till its abutment surface $m^1$ comes in contact with the abutment surface $g^8$. In this position, the sleeve M is again secured on the gauge-body A through the tightening of the lock nut N, the above-named securing device for the sleeve G loosened, and the gauge taken out from the ring-gauge. The sundry slidable parts of the gauge now return into the position shown in Fig. 1, actuated by the respective springs.

The gauge is now ready for testing the bore, the diameter of which is presumed to be the same as the inner diameter of the ring-gauge. In testing such a bore the end of the gauge containing the plungers E is inserted therein and the sleeve G thereupon pushed further into the gauge body A in the direction of arrow $x$ and in the manner already described, till the abutment surface $g^8$ will contact with the abutment surface $m^1$. At this moment the needle H must, in accordance with the foregoing, register with the zero mark on the graduation $h^1$, when the diameter of the bore to be tested is exactly the same as the inner diameter of the ring-gauge, which was used for adjustment purposes. The pressure with which the measuring surfaces $e^1$ abuts against the wall of the bore is thus again entirely depending on the spring K and the calipering is quite independent of the operator's equation and therefore thoroughly reliable. If the diameter of the bore to be tested is smaller than the inner diameter of the ring-gauge, the measuring surfaces $e^1$ will then come in contact with the wall of the bore during the test, sooner than in the previously described test. Then the sleeve G has been displaced a greater amount than before with regard to the rod F, when the abutment surfaces $g^8$ and $m^1$ come in contact. The deflection of the needle H is consequently greater than in the first example. From the amount of deflection of the needle H relative to the zero mark it will be known whether the permissible minus-limit of the bore diameter is exceeded or not. Should the diameter of the bore to be tested be greater than the inner diameter of the ring-gauge, then it follows as is quite evident that the deflection relative to the zero-mark of the needle H takes place in the opposite direction. From the amount of this deflection it will be known whether the permissible plus-limit for the bore diameter has been exceeded or not.

The second embodiment of the invention illustrated in Figs. 3 to 7 differs from the gauge just described mainly in that the sleeve G, in which the rod F is carried, is dependent on the sleeve M. The sleeve G is provided with a collar $g^9$ supported in the enlarged bore of the sleeve M, and against which collar one end of a spring P abuts, the other end of which abuts against the annular surface $m^2$ of the sleeve M. Actuated by the spring P, the abutment surfaces $m^1$ and $g^8$ provided also here upon the sleeves M and G respectively contact with each other. The sleeve M may also be secured on the gauge body A by means of a lock nut N. Moreover, a split ring Q which can be tightened around the sleeve G by a screw R, is carried in a recess $m^3$ of the sleeve M and fitted therein. By means of the split ring Q it is consequently possible to prevent any displacement between the two sleeves G and M. Upon the sleeve M is, lastly, a lifting ring T freely revoluble on the sleeve M abutting against the shoulder $m^4$ on the latter. Two depressions $t^1$ are provided on the ring T, opposite each other and, by means of curved surfaces $t^2$ are joined to the flat end surface $t^3$, see Fig. 3. In the depressions $t^1$ engage projections $g^{11}$, (see Fig. 3) provided on a ring $g^{10}$ secured on the sleeve portion $g^3$ and actuated by the spring P. In other respects the gauge is constructed like the gauge illustrated in Figs. 1 and 2.

In operation, the last described gauge has first to be adjusted by using a ring-gauge as before, the inner diameter of which is exactly the same as the prescribed diameter of the bore to be tested. For this purpose the portion of the gauge carrying the plungers E is inserted in the ring-gauge and, after loosening the screw R and the lock nut N, the sleeve M is screwed in further into the gauge body A. The displacement of the sleeve M herewith taking place in the direction of arrow $x$, Fig. 4, is transmitted to the sleeve G through the intermediary of the spring P, so that the abutment surfaces $m^1$ and $g^8$ remain in contact. By means of the spring K, the rods F, B and the balls C together with the plungers E are also displaced. The measuring surfaces $e^1$ of the plungers E finally come in contact with the wall of the bore.

From this moment on, upon further turning of the sleeve M, the sleeve G together with the housing $g^4$ is displaced relative to the rod F, so that the needle H is deflected, as in the first embodiment. The turning of the sleeve M is continued until the needle H registers with the zero mark of the graduation $h^1$. The lock nut N is now tightened, and the adjustment of the gauge is complete. Upon removing the calipering device from the ring-gauge it will be evident that the needle H returns to the position shown in Fig. 4, as a consequence of the action of the spring K.

When a bore is to be tested, the lifting ring T is first turned, in order to safeguard the measuring surfaces $e^1$, so that the projections $g^{11}$ of the ring $g^{10}$ will glide upon the curved surfaces $t^2$ and the sleeve G with the rod F be displaced relative to the gauge body A in the opposite direction of the arrow $x$. The abutment surface $g^8$ is thus drawn away from the abutment surface $m^1$. Actuated by the springs D, the plungers E follow the displacement of the sleeve G, so that now the gauge may be inserted in the bore without fear of injuring the surfaces $e^1$ of the plungers E.

After the insertion of the gauge in the bore, the lifting ring T is turned back, so that the sleeve G actuated by the spring P again contacts by means of its abutment surface $g^8$ with the abutment surface $m^1$ and the plungers E touch the wall of the bore with their measuring surfaces $e^1$. The further procedure of the test can be easily understood from the description of the first embodiment and needs therefore no further explanation.

When deeper counterbores are to be tested, then, before the gauge is inserted in the bore, and after the sleeve M has been adjusted, the sleeve G has to be withdrawn as far as possible out of the sleeve M against the action of the spring P whereby the plungers E actuated by the springs D follow the displacement of the rod F, and are secured relative to the sleeve M on this position by tightening the screw R and thereby clamping the clamping ring Q. The gauge is now inserted so far in the bore that the plungers E come to lie in the counterbored portion. The screw R is then loosened, so that the abutment surface $g^8$ again contacts with the abutment surface $m^1$. The further procedure of the test takes place in the previously described manner.

Claims.

1. In a caliper gauge the combination of a gauge body, a casing, said casing being slidable relatively to said gauge body, an indicator on said casing, a member operating the indicator and slidable relatively to said casing, a spring interposed between said casing and said member, and a stop engageable by said casing for the purpose described.

2. In a caliper gauge the combination of a gauge body, a casing, said casing being slidable relatively to said gauge body, an indicator on said casing, a member operating the indicator and slidable relatively to said casing, a spring interposed between said casing and said member, a sleeve intermediate to said casing and the gauge body and screw threaded into the latter, said casing having a stop surface, against which the end of the threaded sleeve may abut and a locking nut on said threaded sleeve.

3. In a caliper gauge the combination of a gauge body, a casing, said casing being slidable relatively to said body, an indicator on said casing, a member operating the indicator and slidable relatively to said casing, a spring interposed between said casing and said member, a sleeve intermediate to said casing and the gauge body and screw threaded into the latter, said casing having a stop surface, against which the end of the threaded sleeve may abut, a locking nut on said threaded sleeve and means for securing said casing to the gauge body.

4. In a caliper gauge the combination of a gauge body, a casing, said casing being slidable relatively to said gauge body, an indicator on said casing, a member operating the indicator and slidable relatively to said casing, a spring interposed between said casing and said member, a sleeve intermediate to said casing and the gauge body and screw threaded into the latter, said casing having a stop surface, against which the end of the threaded sleeve may abut and a spring interposed between said casing and said sleeve in such a way, that the end of the threaded sleeve is pressed against said stop surface by the spring.

5. In a caliper gauge the combination of a gauge body, a casing, said casing being slidable relatively to said gauge body, an indicator on said casing, a member operating the indicator and slidable relatively to said casing, a spring interposed between said casing and said member, a sleeve intermediate to said casing and the gauge body and screw threaded into the latter, said casing having a stop surface, against which the end of the threaded sleeve may abut, a spring interposed between said casing and said sleeve and a lifting ring rotatably connected with said sleeve and bearing against said casing.

6. In a caliper gauge the combination of a gauge body, a casing, said casing being slidable relatively to said gauge body, an indicator on said casing, a member operating the indicator and slidable relatively to said casing, a spring interposed between said casing and said member, a radial spring retracted contacting member, an expanding member for such contacting member, said slidable member operating said expanding member.

The foregoing specification signed at Essen, Germany, this 13th day of October, 1921.

MAX BARTHOLDY.